US012263563B2

(12) United States Patent

Lottes-Paukner et al.

(10) Patent No.: US 12,263,563 B2

(45) Date of Patent: Apr. 1, 2025

(54) COMPACT IMPACT TOOL

(71) Applicant: MILWAUKEE ELECTRIC TOOL CORPORATION, Brookfield, WI (US)

(72) Inventors: Joseph T. Lottes-Paukner, Sussex, WI (US); Jacob P. Schneider, Cedarburg, WI (US); Mackenzie J. Nick, Theresa, WI (US); Kentez L. Craig, Theresa, WI (US); Evan Brown, Milwaukee, WI (US); Joseph J. Drees, Milwaukee, WI (US); Benjamin J. Skelton, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/210,720

(22) Filed: Jun. 16, 2023

(65) Prior Publication Data

US 2023/0405775 A1 Dec. 21, 2023

Related U.S. Application Data

(60) Provisional application No. 63/352,671, filed on Jun. 16, 2022.

(51) Int. Cl.
*B25B 21/02* (2006.01)
*B25F 5/00* (2006.01)

(52) U.S. Cl.
CPC .............. *B25B 21/02* (2013.01); *B25F 5/006* (2013.01)

(58) Field of Classification Search
CPC ................................. B25B 21/02; B25F 5/006
See application file for complete search history.

(56) References Cited

U.S. PATENT DOCUMENTS

| | | | |
|---|---|---|---|
| 3,090,258 | A | 5/1963 | Zink et al. |
| 3,166,168 | A | 1/1965 | Hornschuch |
| 3,369,615 | A | 2/1968 | Maffey, Jr. et al. |

(Continued)

FOREIGN PATENT DOCUMENTS

| | | | |
|---|---|---|---|
| CN | 2843768 | Y | 12/2006 |
| CN | 102092037 | A | 6/2011 |

(Continued)

OTHER PUBLICATIONS

Partial European Search Report for Application No. 23179387.8 dated Nov. 20, 2023 (11 pages).

*Primary Examiner* — Nathaniel C Chukwurah

(74) *Attorney, Agent, or Firm* — Michael Best & Friedrich LLP

(57) ABSTRACT

A power tool includes a first housing portion and a second housing portion, a motor directly mounted between the housing portions with an output shaft defining an axis, and a gear assembly supported within the housing and including a ring gear directly supported by the housing portions, a pinion gear coupled for co-rotation with the output shaft, and planet gears meshed with the pinion gear and the ring gear. The power tool also includes a drive assembly operably coupled to the gear assembly with a camshaft, an anvil, a hammer configured to reciprocate along the camshaft to impart rotational impacts to the anvil, and a spring biasing the hammer towards the anvil. The ring gear includes lugs engaged with the first housing portion and the second housing portion to rotationally constrain the ring gear.

20 Claims, 12 Drawing Sheets

(56) References Cited

U.S. PATENT DOCUMENTS

| | | | |
|---|---|---|---|
| 3,785,443 A | 1/1974 | Armbruster | |
| 3,817,115 A | 6/1974 | Schnizler et al. | |
| 4,597,453 A | 7/1986 | Kilmer et al. | |
| 5,251,406 A | 10/1993 | Kirn | |
| 6,671,969 B2 | 1/2004 | Phillips et al. | |
| 6,805,207 B2 | 10/2004 | Hagan et al. | |
| 7,080,696 B2 | 7/2006 | Soika et al. | |
| 7,096,589 B2 | 8/2006 | Phillips et al. | |
| 7,134,508 B2 | 11/2006 | Prell et al. | |
| 7,204,026 B2 | 4/2007 | Phillips et al. | |
| 7,395,876 B1 | 7/2008 | Walker | |
| 7,413,025 B2 | 8/2008 | Provost | |
| 7,513,845 B2 | 4/2009 | Ho | |
| 7,537,540 B2 | 5/2009 | Baumann et al. | |
| 7,556,864 B2 | 7/2009 | Yamanishi et al. | |
| 7,644,783 B2 | 1/2010 | Roberts et al. | |
| 7,845,427 B2 | 12/2010 | Wan et al. | |
| 8,037,948 B2 | 10/2011 | Albinsson et al. | |
| 8,186,689 B2 | 5/2012 | Miyazawa et al. | |
| 8,210,277 B2 | 7/2012 | Umeda et al. | |
| 8,303,449 B2 | 11/2012 | Ho et al. | |
| 8,584,770 B2 | 11/2013 | Zhang et al. | |
| 9,097,331 B2 | 8/2015 | Saur et al. | |
| 9,212,725 B2 | 12/2015 | Steckel et al. | |
| 9,216,504 B2 | 12/2015 | Zhang et al. | |
| 9,314,896 B2 | 4/2016 | Radif | |
| 9,391,482 B2 | 7/2016 | Kuwata | |
| 9,427,850 B2 | 8/2016 | Ullrich et al. | |
| 9,844,869 B2 | 12/2017 | Ullrich et al. | |
| 9,878,435 B2 | 1/2018 | Ito | |
| 9,950,419 B2 | 4/2018 | Rompel et al. | |
| 10,183,390 B2 | 1/2019 | Wiedemann et al. | |
| 10,434,635 B2 | 10/2019 | Blum et al. | |
| 10,486,296 B2 | 11/2019 | Ito | |
| 10,525,580 B2 | 1/2020 | Mao | |
| 10,668,614 B2 | 6/2020 | Bartoszek et al. | |
| 10,843,314 B2 | 11/2020 | Li | |
| 10,971,966 B2 | 4/2021 | Kuehne et al. | |
| 11,073,203 B2 | 7/2021 | Nakashima | |
| 11,148,275 B2 | 10/2021 | Herr et al. | |
| 11,260,515 B2 | 3/2022 | Ito | |
| 11,285,595 B2 | 3/2022 | Huggenberger | |
| 11,453,109 B2 | 9/2022 | Nakashima | |
| 11,485,004 B2 | 11/2022 | Huggenberger | |
| 11,565,394 B2 | 1/2023 | Cyborski et al. | |
| 11,602,832 B2 | 3/2023 | Bartoszek et al. | |
| 2003/0173178 A1* | 9/2003 | Sasaki | F16D 41/206 192/3.51 |
| 2005/0022358 A1 | 2/2005 | Hagan et al. | |
| 2005/0028997 A1 | 2/2005 | Hagan et al. | |
| 2005/0061524 A1 | 3/2005 | Hagan et al. | |
| 2006/0108180 A1 | 5/2006 | Grach et al. | |
| 2006/0260141 A1 | 11/2006 | Phillips et al. | |
| 2006/0290213 A1 | 12/2006 | Furui et al. | |
| 2008/0047150 A1 | 2/2008 | Phillips et al. | |
| 2008/0271906 A1 | 11/2008 | Walker | |
| 2009/0258584 A1 | 10/2009 | Huber et al. | |
| 2009/0321101 A1 | 12/2009 | Furusawa et al. | |
| 2013/0072341 A1 | 3/2013 | Chen | |
| 2013/0098648 A1 | 4/2013 | Furusawa et al. | |
| 2013/0255982 A1 | 10/2013 | Takahashi et al. | |
| 2014/0124229 A1 | 5/2014 | Takahashi et al. | |
| 2014/0262394 A1* | 9/2014 | Scott | B25B 23/0007 173/48 |
| 2015/0343617 A1* | 12/2015 | Kondo | B25B 21/02 173/93 |
| 2020/0047322 A1 | 2/2020 | Ito | |
| 2020/0189086 A1 | 6/2020 | Liang et al. | |
| 2020/0262037 A1* | 8/2020 | Schneider | B25B 21/026 |
| 2020/0282540 A1 | 9/2020 | Bartoszek et al. | |
| 2021/0107131 A1 | 4/2021 | Kuehne et al. | |
| 2021/0187717 A1 | 6/2021 | McClung et al. | |
| 2021/0194312 A1 | 6/2021 | Kuehne et al. | |
| 2022/0134527 A1 | 5/2022 | Ito | |
| 2022/0354052 A1 | 11/2022 | Jefferies et al. | |
| 2023/0008797 A1 | 1/2023 | Saur et al. | |
| 2023/0055261 A1 | 2/2023 | Hatakeyama | |

FOREIGN PATENT DOCUMENTS

| | | | |
|---|---|---|---|
| CN | 202780971 | U | 3/2013 |
| CN | 203973457 | U | 12/2014 |
| CN | 205129710 | U | 4/2016 |
| CN | 205438463 | U | 8/2016 |
| CN | 206200848 | U | 5/2017 |
| CN | 206200849 | U | 5/2017 |
| CN | 207788865 | U | 8/2018 |
| CN | 108637957 | A | 10/2018 |
| CN | 108972459 | A | 12/2018 |
| CN | 209774498 | U | 12/2019 |
| CN | 110815138 | A | 2/2020 |
| CN | 108942768 | B | 4/2020 |
| CN | 210633570 | U | 5/2020 |
| CN | 212071751 | U | 12/2020 |
| CN | 110702060 | B | 5/2021 |
| CN | 213411817 | U | 6/2021 |
| CN | 214186953 | U | 9/2021 |
| CN | 214238046 | U | 9/2021 |
| CN | 217530667 | U | 10/2022 |
| DE | 4328599 | A1 | 3/1994 |
| DE | 19729988 | C1 | 8/1998 |
| DE | 19913020 | A1 | 10/2000 |
| DE | 102004016922 | A1 | 11/2005 |
| DE | 102010062583 | A1 | 6/2012 |
| DE | 202016103701 | U1 | 7/2016 |
| DE | 102015226029 | A1 | 6/2017 |
| DE | 102017209832 | A1 | 12/2018 |
| EP | 0261374 | A1 | 3/1988 |
| EP | 0489277 | A1 | 6/1992 |
| EP | 0570889 | A1 | 11/1993 |
| EP | 1787765 | A2 | 5/2007 |
| EP | 2813325 | A2 | 12/2014 |
| JP | 2001328080 | A | 11/2001 |
| JP | 2005014145 | A | 1/2005 |
| JP | 2006051570 | A | 2/2006 |
| WO | 2011152136 | A1 | 12/2011 |
| WO | 2014133229 | A1 | 9/2014 |
| WO | 2018011206 | A1 | 1/2018 |
| WO | 2021041829 | A1 | 3/2021 |

* cited by examiner

COMPACT IMPACT TOOL

CROSS-REFERENCE TO RELATED APPLICATION

This application claims priority to U.S. Provisional Patent Application No. 63/352,671, filed Jun. 16, 2022, the entire contents of which are incorporated by reference herein.

FIELD OF THE INVENTION

The present invention relates to power tools, and more particularly to rotary impact tools, such as impact wrenches.

BACKGROUND OF THE INVENTION

Rotary impact tools are typically utilized to provide a striking rotational force, or intermittent applications of torque, to a tool element or workpiece (e.g., a fastener) to either tighten or loosen the fastener.

SUMMARY OF THE INVENTION

The present invention provides, in one aspect, a power tool including a housing having a first housing portion and a second housing portion coupled to the first housing portion, a motor directly mounted within the housing between the first and second housing portions and including an output shaft, the output shaft defining an axis, a gear assembly supported within the housing and operably coupled to the motor, the gear assembly including a ring gear directly supported by the first and second housing portions, a pinion gear coupled for co-rotation with the output shaft, and a plurality of planet gears meshed with the pinion gear and the ring gear. The power tool also includes a drive assembly operably coupled to the gear assembly, the drive assembly including a camshaft, an anvil, a hammer configured to reciprocate along the camshaft to impart rotational impacts to the anvil in response to rotation of the camshaft, and a spring biasing the hammer towards the anvil. The ring gear includes a plurality of lugs engaged with the first housing portion and the second housing portion to rotationally constrain the ring gear.

The present disclosure provides, in another aspect, a power tool including a housing having a motor housing portion and a handle portion extending from the motor housing portion, the motor housing portion and the handle portion defined by cooperating first and second clamshell halves coupled together along a parting plane, a motor supported within the motor housing portion and including an output shaft, the output shaft defining an axis, and a gear assembly supported within the housing and operably coupled to the motor, the gear assembly including a ring gear directly supported by the first and second clamshell halves, a pinion gear coupled for co-rotation with the output shaft, and a plurality of planet gears meshed with the pinion gear and the ring gear. The power tool also includes a drive assembly operably coupled to the gear assembly, the drive assembly including a camshaft, an anvil, a hammer configured to reciprocate along the camshaft to impart rotational impacts to the anvil in response to rotation of the camshaft, and a spring biasing the hammer towards the anvil. The ring gear includes a plurality of lugs engaged with the first and second clamshell halves to rotationally constrain the ring gear, and the plurality of lugs is arranged such that all resultant force vectors on the first and second clamshell halves due to torque on the ring gear are oriented at an angle between 0 degrees and 45 degrees relative to the parting plane.

The present disclosure provides, in another aspect, a power tool including a housing having a first housing portion and a second housing portion coupled to the first housing portion, a motor directly mounted within the housing between the first and second housing portions and including an output shaft, the output shaft defining an axis, a gear assembly supported within the housing and operably coupled to the motor, the gear assembly including a ring gear and a pinion gear coupled to the output shaft, and a drive assembly operably coupled to the gear assembly, the drive assembly including a camshaft, an anvil, and a hammer configured to reciprocate along the camshaft to impart rotational impacts to the anvil in response to rotation of the camshaft. The camshaft includes a bore through which an extension of the pinion gear extends. A pinion seal is supported on the pinion gear, the pinion seal including a flange configured to seal at least one selected from a group consisting of a first interface between the pinion gear and the camshaft and a second interface between the camshaft and the ring gear.

Other features and aspects of the disclosure will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

The present disclosure provides, among other things, embodiments of an impact wrench including combinations of components and dimensions that provide the impact wrench with a very compact overall size but still enable the impact wrench to deliver a large amount of torque to a desired fastening application. For example, in some embodiments, the impact wrench includes a ring gear with a circumferential projection, and the ring gear is directly supported by a clamshell housing of the impact wrench without requiring any additional supports in front of the ring gear. This advantageously reduces the length required for supporting the ring gear. In some embodiments, the impact wrench includes a bearing for supporting a pinion gear coupled to an output shaft of the motor. The bearing is received within a bore of a camshaft at a location in front of the ring gear and associated planet gears. This arrangement also contributes to length reduction. In some embodiments, the impact wrench may include a vibration isolating connection incorporated into a handle of the impact wrench, to reduce the transmission of vibration to a battery pack supported on the handle.

Figure 1:
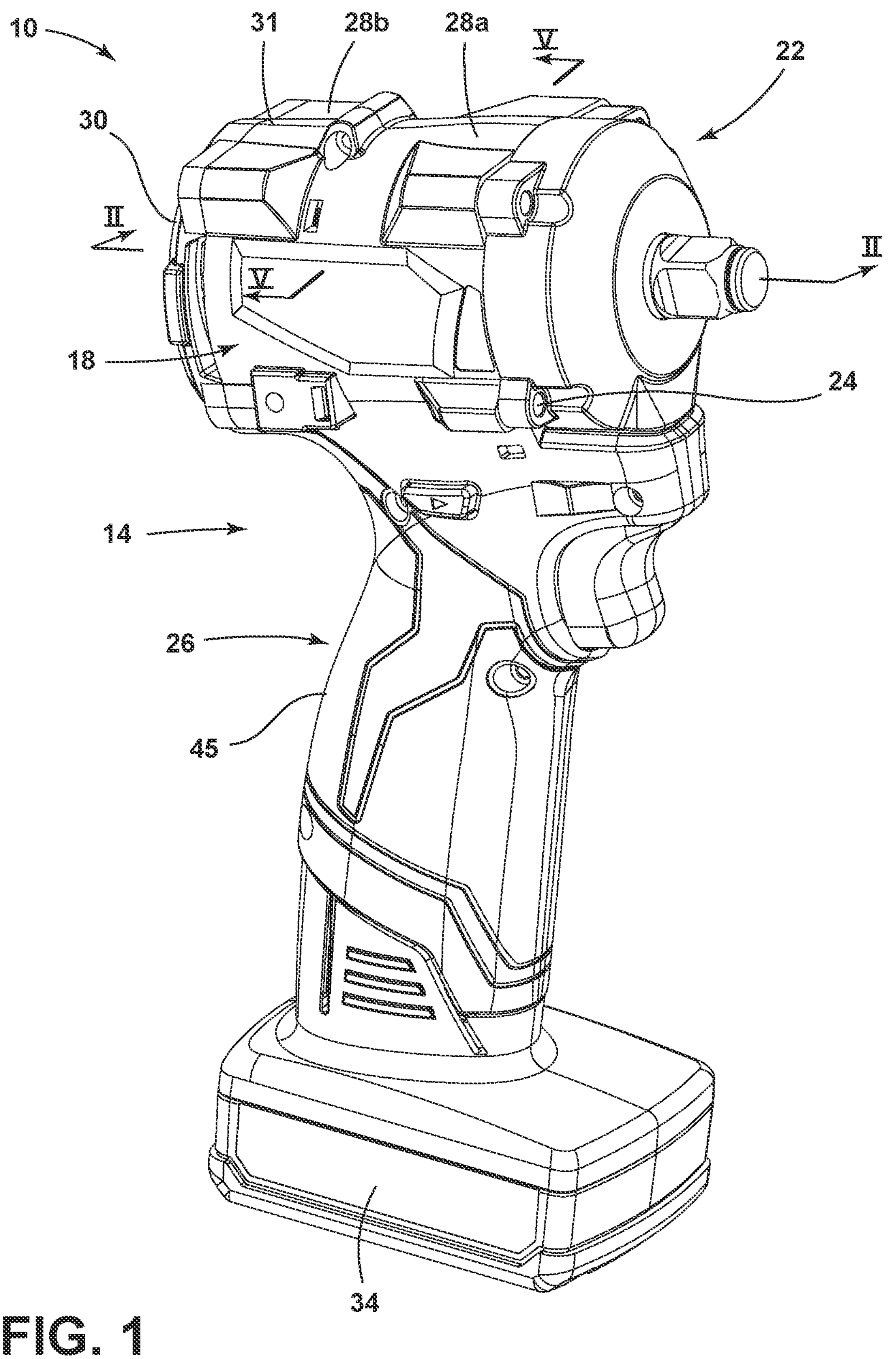
FIG. 1 is a perspective view of a power tool according to an embodiment of the invention.

FIG. 1 illustrates an embodiment of a power tool in the form of a rotary impact tool, and, more specifically, an impact wrench 10. The impact wrench 10 includes a housing 14 with a motor housing portion 18, an impact case or front housing portion 22 coupled to the motor housing portion 18 (e.g., by a plurality of fasteners 24), and a handle portion 26 extending downwardly from the motor housing portion 18. In the illustrated embodiment, the handle portion 26 and the motor housing portion 18 are defined by a first clamshell half **28*a* and a cooperating second clamshell half 28*b*** (i.e., a first housing portion and a second housing portion).

Figure 4:
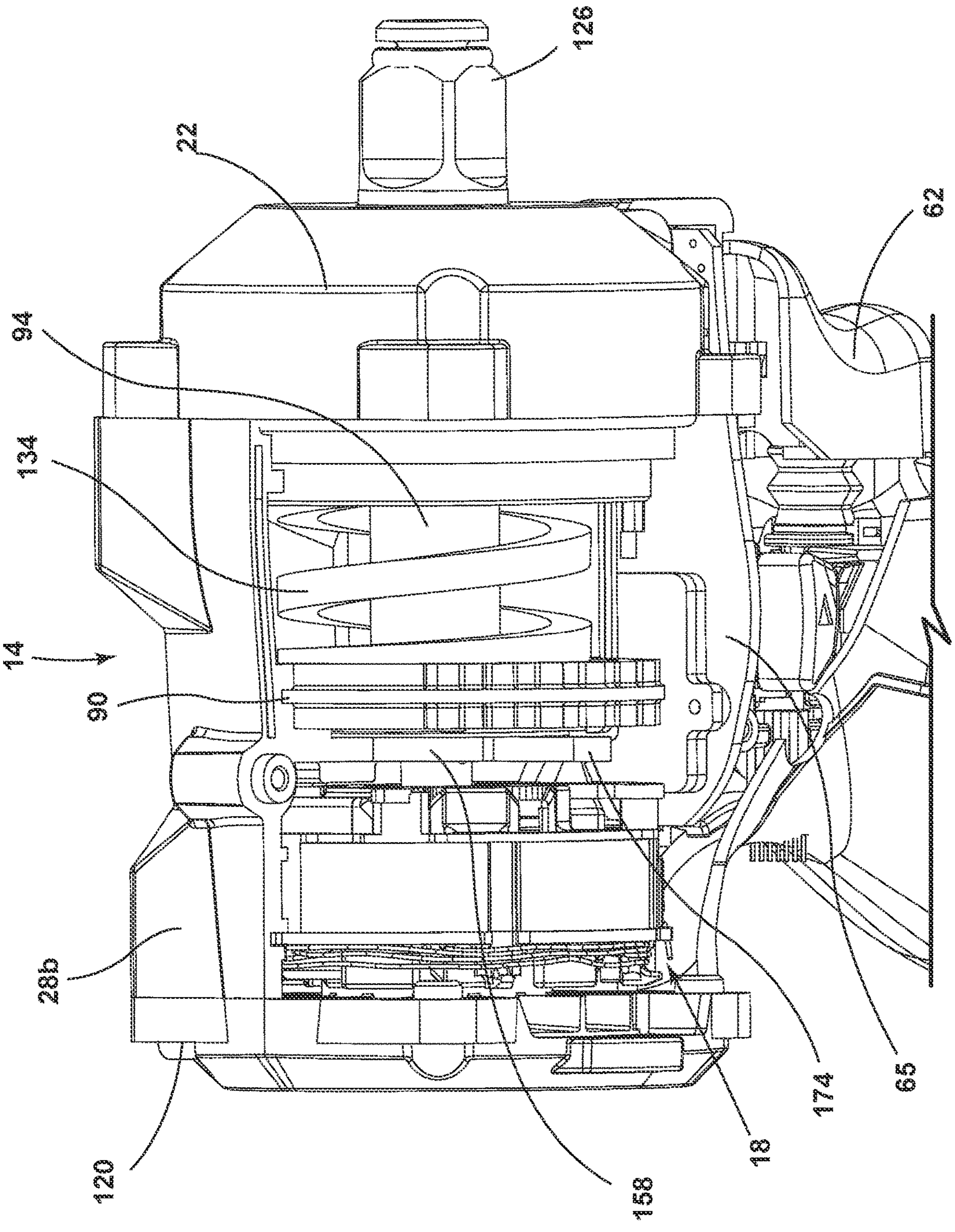
FIG. 4 is a perspective view of a portion of the power tool of FIG. 1, with a housing portion of the power tool hidden.

The illustrated housing 14 also includes an end cap 30 coupled to the motor housing portion 18 opposite the front housing portion 22. The first and second housing portions **28*a*, 28*b* can be coupled (e.g., fastened) together at an interface or seam 31. In the illustrated embodiment, the end cap 30 is continuous and may be pressed or fitted over a rear end of the clamshell halves 28*a*, 28*b*. In other words, the end cap 30 may not include two halves such that the end cap 30 may extend over the seam 31. The end cap 30 is coupled to the motor housing portion 18 by a plurality of fasteners 120 (FIG. 4). In yet other embodiments, the impact wrench 10 may not include a separate end cap, such that the clamshell halves 28*a*, 28*b* instead define the rear end of the motor housing portion 18**.

Figure 2:
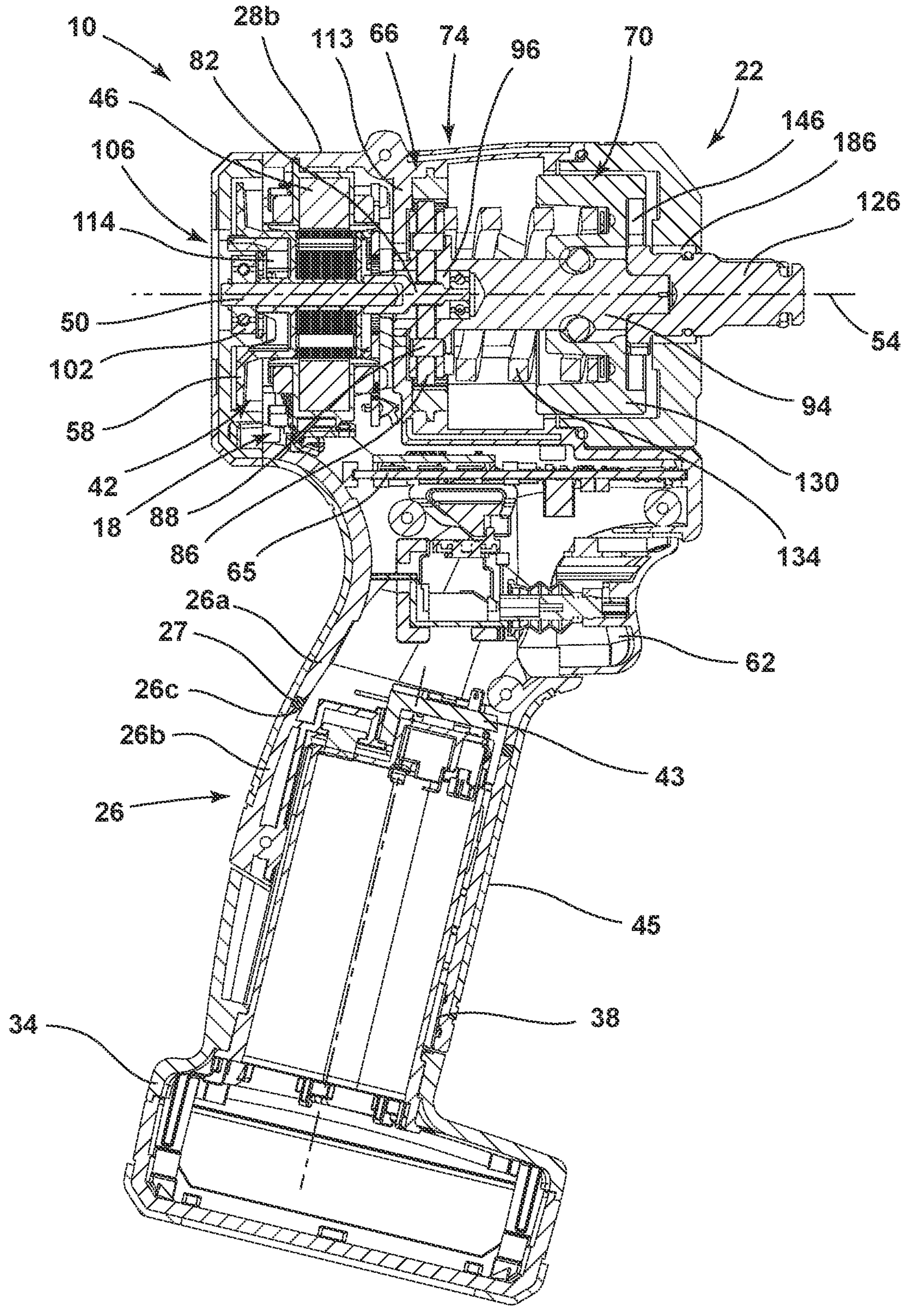
FIG. 2 is a cross-sectional view of the power tool of FIG. 1, taken along line 2-2 in FIG. 1.

Referring to FIGS. 1 and 2, the impact wrench 10 includes a battery 34 removably coupled to a battery receptacle 38, which in the illustrated embodiment, includes a cavity extending into the handle portion 26. A motor 42 is supported within the motor housing portion 18 and receives power from the battery 34 via connections, pads, and/or battery terminals 43 in the battery receptacle 38 when the battery 34 is coupled to the battery receptacle 38. In the illustrated embodiment, the handle portion 26 of the clamshell halves **28*a*, 28*b* can be covered or surrounded by a grip portion 45, which may be overmolded on the handle portion 26**.

The battery 34 may be a power tool battery pack generally used to supply power to a power tool, such as an electric drill, an electric saw, and the like (e.g., a 12 volt rechargeable battery pack, such as an M12 REDLITHIUM battery pack sold by Milwaukee Electric Tool Corporation). The battery 34 may include lithium ion (Li-ion) cells. The 12 volt nominal output voltage of the battery 34 provides an optimal balance between weight/size and power in the illustrated impact wrench 10; however, batteries with other nominal voltages may be used in other embodiments.

Referring to FIG. 2, in the illustrated embodiment, the handle portion 26 includes an upper portion **26*a* extending from the motor housing portion 18 and a lower portion 26*b* movably coupled to the upper portion 26*a* via a vibration isolating connection 26*c*. The vibration isolating connection 26*c* includes a damping element 27, which may be made of a vibration damping material, such as an elastomeric material. In some embodiments, the damping element 27 may be generally ring-shaped. In the illustrated embodiment, the damping element 27 is received in a gap between the upper and lower portions 26*a*, 26*b* and covered by the overmolded grip portion 45. In yet other embodiments, the damping element 27 may be integrally formed as a single piece with the overmolded grip portion 45** (i.e. during the grip overmolding process).

The damping element 27 at least partially mechanically isolates the lower portion **26*b* of the handle portion 26 from the upper portion 26*a* and thereby inhibits transmission of vibration from the upper portion 26*a* to the lower portion 26*b*. The battery 34 is coupled to and supported by the lower portion 26*b*. As such, the vibration isolating connection 26*c*, including the damping element 27, is configured to isolate the battery 34 from vibrations produced during operation of the impact wrench 10**.

Figure 3:
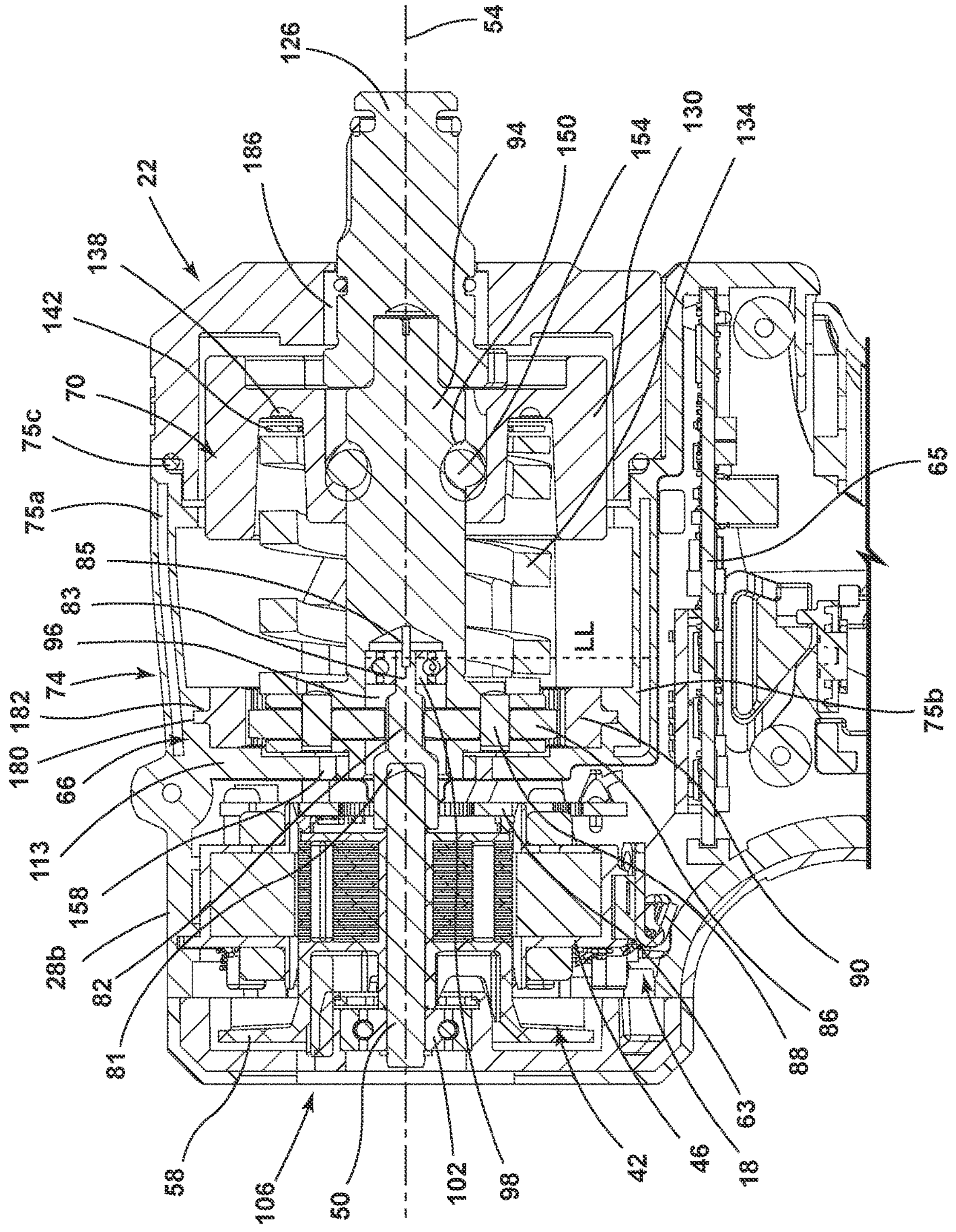
FIG. 3 is a magnified view of a portion of the cross-sectional view of FIG. 2.

Now referring to FIGS. 2 and 3, in the illustrated embodiment, the motor 42 is a brushless direct current ("BLDC") motor with a stator 46 and a rotor with an output shaft 50 that is rotatable about an axis 54 relative to the stator 46. The brushless motor 42 preferably has a nominal diameter of 50 millimeters, or more than 50 millimeters in other embodiments. In yet other embodiments, other types of motors may be used. A fan 58 is coupled to the output shaft 50 behind the motor 42 to generate airflow. The impact wrench 10 also includes a switch 62 (e.g., a trigger switch; FIG. 2) supported by the housing 14 that selectively connects the motor 42 (e.g., via suitable control circuitry provided on one or more printed circuit board assemblies ("PCBAs") and the battery 34 electrically, to provide DC power to the motor 42. In other embodiments, the impact wrench 10 may include a power cord for electrically connecting the switch 62 and the motor 42 to a source of AC power. As a further alternative, the impact wrench 10 may be configured to operate using a different power source (e.g., a pneumatic or hydraulic power source, etc.).

In the illustrated embodiment, a first PCBA 63 is provided adjacent a front end of the motor 42 (FIG. 3). The illustrated first PCBA 63 includes one or more Hall-Effect sensors, which provide feedback for controlling the motor 42. A second PCBA 65 is positioned within the handle portion 26 (adjacent a top end of the handle portion 26) and generally between the switch 62 and the motor 42. The second PCBA 65 is in electrical communication with the motor 42, the switch 62, and the battery receptacle 38. In the illustrated embodiment, the second PCBA 65 includes a plurality of semi-conductor switching elements (e.g., MOSFETs, IGBTs, or the like) that control and distribute power to windings in the stator 46 in order to cause rotation of the rotor and output shaft 50. The second PCBA 65 may also include one or more microprocessors, machine-readable, non-transitory memory elements, and other electrical or electronic elements for providing operational control to the impact wrench 10. In some embodiments, the first PCBA 63 may be omitted, and the motor 42 may be configured for sensorless control via the second PCBA 65.

Figure 5:
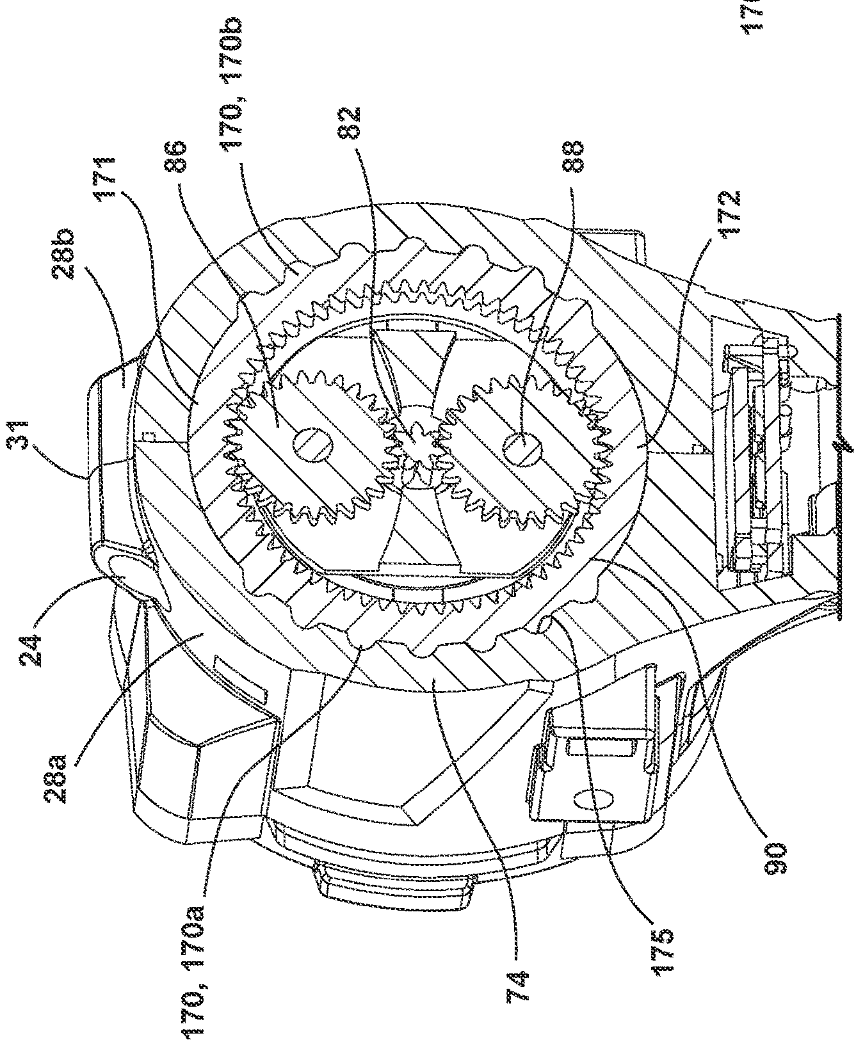
FIG. 5 is a cross-sectional tool of a portion of the power tool of FIG. 1, taken along line 5-5 in FIG. 1.

In the illustrated embodiment, as best shown in FIG. 5, the clamshell halves 28*a*, 28*b* are positioned to at least partially overlap one another at the seam 31, and the grip portion 45 is shaped to surround the mated clamshell halves 28*a*, 28*b*. Fasteners (e.g., fasteners 24) may be threaded, pinned, inserted, etc. into each of the clamshell halves 28*a*, 28*b* to further secure the housing 14 of the handle portion 26 in a closed or generally sealed position.

Referring now to FIGS. 2 and 3, the impact wrench 10 further includes a gear assembly 66 driven by the output shaft 50 and an impact mechanism 70 coupled to an output of the gear assembly 66. The impact mechanism 70 may also be referred to herein as a drive assembly 70. The gear assembly 66 may be configured in any of a number of different ways to provide a speed reduction between the output shaft 50 and an input of the drive assembly 70. The gear assembly 66 is at least partially housed within the housing 14, and specifically within a gear housing portion 74 of the housing defined by the clamshell halves 28*a*, 28*b* in the illustrated embodiment. That is, the impact wrench 10 does not include a separate gear case positioned within the housing 14 for supporting the gear assembly 66. Instead, the gear assembly 66—and particularly a ring gear 90 of the gear assembly 66—is directly supported by the clamshell halves 28*a*, 28*b*. This may advantageously reduce the size, weight, and/or manufacturing cost associated with the impact wrench 10. However, in alternate embodiments, the ring gear 90 may be supported within a separate gear case within the housing 14.

In the illustrated embodiment, the motor housing 18 and handle portion 26 include a rigid polymer or plastic material and the front housing portion 22 is metal. In some embodiments, the gear housing portion 74 may include additional and/or differently composed material (e.g., stronger) to support the gear assembly 66. As will be described in greater detail below, the configurations of the gear assembly 66 and gear housing portion 74 of the impact wrench 10 described herein advantageously reduces an overall size of the impact wrench 10.

Referring to FIG. 3, the gear housing portion 74 may contain lubricant, such as grease or oil, that assists in smooth operation of the impact wrench 10 by minimizing friction between movable components. The impact wrench 10 includes a plurality of sealing elements 75*a*, 75*b*, 75*c*, which inhibit the lubricant from leaking out of the gear housing portion 74. In the illustrated embodiment, first and second elongated sealing elements 75*a*, are positioned within walls of the clamshell halves 28*a*, 28*b* such that the elongated sealing elements 75*a*, 75*b* generally extend along and seal upper and lower sides of the gear housing portion 74. A third sealing element 75*c*, which is an annular sealing element such as an o-ring, forms a seal between the clamshell halves 28*a*, 28*b* and the front housing portion 22.

As illustrated in FIGS. 3 and 5, the gear assembly 66 includes a pinion gear 82 coupled to the output shaft 50 of the motor 42, a plurality of planet gears 86 meshed with the pinion gear 82, and a ring gear 90 meshed with the planet gears 86 and rotationally fixed within the housing 14 (specifically, within the gear housing portion 74). A rearward facing side of the ring gear 90 is seated against a dividing wall 113 formed by the clamshell halves 28*a*, 28*b* (FIG. 3). The dividing wall 113 separates the interior of the gear housing portion 74 from the motor 42. The illustrated pinion gear 82 includes a recess 81 that receives the output shaft 50 and an extension 83. The output shaft 50 may be press fit into the recess 81, or the output shaft 50 and the recess 81 may include cooperating spline patterns or other suitable geometries for coupling the pinion gear 82 for co-rotation with the output shaft 50. In other embodiments, the pinion gear 82 may be integrally formed as a single piece with the output shaft 50.

Referring to FIG. 5, the illustrated ring gear 90 includes a plurality of lugs 170. In the illustrated embodiment, the lugs 170 of the ring gear 90 fit within grooves 175 formed by the clamshell halves 28*a*, 28*b* to support and constrain the ring gear 90 in a rotational direction. As shown in FIG. 5, the lugs 170 include a first set of lugs 170*a* and a second set of lugs 170*b* extending from opposite lateral sides of the ring gear 90. The lugs 170 are positioned such that the first set of lugs 170*a* is received by grooves 175 of the first clamshell half 28*a*, and the second set of lugs 170*b* is received by grooves 175 of the second clamshell half 28*b*. The illustrated ring gear 90 includes upper and lower regions 171, 172 without any lugs 170. Each of the upper and lower regions 171, 172 may span between about 25 degrees and about 60 degrees of the circumference of the ring gear 90. Because the lugs 170 are positioned only along the lateral sides of the ring gear 90, reaction forces experienced by the housing 14 due to torque on the ring gear 90 during operation of the impact wrench 10 have resultant force vectors oriented in a generally vertical direction (i.e., generally parallel to the parting plane of the clamshell halves 28*a*, 28*b*.) For example, the lugs 170 may transmit reaction forces with resultant force vectors oriented at angles between 0 and 45 degrees relative to the parting plane in some embodiments. In some embodiments, the lugs 170 may transmit reaction forces with resultant force vectors oriented at angles between 0 and 30 degrees relative to the parting plane. This reduces separation of the clamshell halves 28*a*, 28*b* due the reaction forces.

With reference to FIG. 3, the planet gears 86 are coupled, via pins 88, to a camshaft 94 of the drive assembly 70 such that the camshaft 94 acts as a planet carrier. Accordingly, rotation of the output shaft 50 rotates the planet gears 86, which then advance along the inner circumference of the ring gear 90 and thereby rotates the camshaft 94. In the illustrated embodiment, the camshaft 94 includes a bore 96 extending partially through the camshaft 94 along the axis 54. The bore 96 is shaped to accommodate and/or receive at least a portion of the pinion gear 82. In the illustrated embodiment, the bore 96 extends only partially through the length of the camshaft 94; however, the bore 96 may extend through the entire length of the camshaft 94, to reduce the weight of the camshaft 94, in other embodiments.

Figure 6:
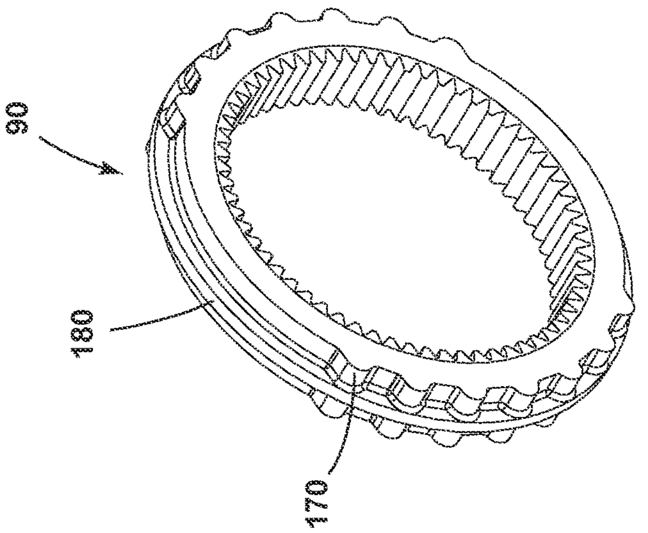
FIG. 6 is a perspective view of a ring gear of a gear assembly of the power tool of FIG. 1.

With reference to FIG. 6, the ring gear 90 of the impact wrench 10 includes a rib 180 extending around a circumference of the ring gear 90. The gear housing portion 74 includes a recess 182 (FIG. 3) disposed around an interior circumference of the gear housing portion 74. The rib 180 of the ring gear 90 is disposed within the recess 182 of the gear housing portion 74 such that the ring gear 90 is axially constrained with respect to the gear housing portion 74. By axially constraining the ring gear 90 with a feature along a circumference of the ring gear 90, an overall length OL (FIG. 9) of the impact wrench 10 is reduced compared to typical impact-type power tools, in which the ring gear may be axially secured using a mechanism that is disposed past a front face of the ring gear (i.e., axially toward the anvil). In such typical impact-type power tools, such securing features may reduce the available space to accommodate rearward travel of the hammer, thus requiring an increase in the overall tool length to accommodate hammer travel.

Referring to FIGS. 2 and 3, the output shaft 50 is rotatably supported by a first or forward bearing 98 and a second or rear bearing 102. The pinion gear 82, coupled to the output shaft 50, extends through an opening in the dividing wall 113. The impact wrench 10 includes a hub or bearing retainer 106, which may be at least partially integrally formed with the end cap 30 in some embodiments, and which secures the rear bearing 102 both axially (e.g., against forces transmitted along the axis 54) and radially (i.e., against forces transmitted in a radial direction of the output shaft 50). In the illustrated embodiment, the fan 58 includes a recess 114 and the bearing retainer 106 extends into the recess 114 such that at least a portion of the bearing retainer 106 and at least a portion of the rear bearing 102 overlap the fan 58 along the axis 54 (FIG. 2). This overlapping arrangement advantageously reduces the axial length of the impact wrench 10.

With continued reference to FIGS. 2 and 3, the forward bearing 98 is axially recessed within the bore 96 of the camshaft 94 and supports the extension 83 of the pinion gear 82. An alignment pin 85 is axially recessed within the extension 83 and is configured to align the pinion gear 82 with the bore 96 of the camshaft 94 and the forward bearing 98 (e.g., during assembly of the impact wrench 10). The forward bearing 98 is coupled to and supported by the camshaft 94 (e.g., at an outer race of the forward bearing 98), such that at least a portion of the forward bearing 98 is located axially in front of ring gear 90 and the planet gears 86, and the forward bearing 98 is axially aligned with a portion of a spring 134, described in greater detail below. In this manner, the housing 14, spring 134, camshaft 94, forward bearing 98, and the extension 83 of the pinion gear 82 each overlap along the axis 54. In other words, at least one plane LL (FIG. 3) can be drawn in a radially outward direction from the extension 83 of the pinion gear 82 that intersects the housing 14, spring 134, camshaft 94, and forward bearing 98.

The drive assembly 70 of the impact wrench 10 will now be described with reference to FIG. 3. The drive assembly 70 includes an anvil 126, extending from the front housing portion 22, to which a tool element (e.g., a socket, not shown) can be coupled for performing work on a workpiece (e.g., a fastener). The drive assembly 70 is configured to convert the constant rotational force or torque provided by the gear assembly 66 to a striking rotational force or intermittent applications of torque to the anvil 126 when the reaction torque on the anvil 126 (e.g., due to engagement between the tool element and a fastener being worked upon) exceeds a certain threshold. In the illustrated embodiment of the impact wrench 10, the drive assembly 70 includes the camshaft 94, a hammer 130 supported on and axially slidable relative to the camshaft 94, and the anvil 126. Stated another way, the hammer 130 is configured to reciprocate axially along the camshaft 94 and impart periodic rotational impacts to the anvil 126 in response to rotation of the camshaft 94.

The drive assembly 70 further includes a spring 134 that biases the hammer 130 toward the front of the impact wrench 10. In other words, the spring 134 biases the hammer 130 in an axial direction toward the anvil 126, along the axis 54. A thrust bearing 138 and a thrust washer 142 are positioned between the spring 134 and the hammer 130. The thrust bearing 138 and the thrust washer 142 allow for the spring 134 and the camshaft 94 to continue to rotate relative to the hammer 130 after each impact strike when lugs 146 on the hammer 130 engage with corresponding anvil lugs (not shown) and rotation of the hammer 130 momentarily stops or reverses. The camshaft 94 includes cam grooves 150 in which corresponding cam balls 154 are received. The cam balls 154 are in driving engagement with the hammer 130 and movement of the cam balls 154 within the cam grooves 150 allows for relative axial movement of the hammer 130 along the camshaft 94 when the hammer lugs 146 and the anvil lugs are engaged and the camshaft 94 continues to rotate. The axial movement of the hammer 130 compresses the spring 134, which then releases its stored energy to propel the hammer 130 forward and rotate the hammer 130 once the hammer lugs 146 clear the anvil lugs.

In some embodiments, the hammer spring 134 is formed from a cylindrical coil and, therefore, possesses a circular cross-section. In other embodiments, such as the illustrated embodiment, the spring 134 of the impact wrench 10 is formed from a rectangular coil and possesses a rectangular cross-section. In some embodiments, the cross-section of the spring 134 may be square. Because a spring formed with a rectangular or square cross-section has a larger cross-sectional area and larger area moment of inertia than a typical coil spring formed with a circular cross-section having an outer diameter equal to a shortest side length of the rectangular or square-cross-section, the spring 134 of the impact wrench 10 may have a larger spring constant than a circular coil spring in a typical impact-type power tool with the same outer diameter and number of active coils. Accordingly, the impact wrench 10 can be built with smaller dimensions than a typical impact-type power tool while storing an equal or greater amount of hammer energy in the spring 134 and thereby providing an equal or larger operating torque. In some embodiments, the spring 134 is made from a chrome silicone spring steel.

In the illustrated embodiment, with reference to FIGS. 2 and 3, the impact wrench 10 further includes a bushing 158 supported by the dividing wall 113 and surrounding the camshaft 94. The illustrated bushing 158 includes a plurality of arms 174 (FIG. 4). The arms 174 of the bushing 158 fit within grooves (not shown) of the housing 14 to rotationally fix the bushing 158 relative to the housing 14. In some embodiments, the bushing 158 may include two arms 174 positioned opposite one another to support the bushing 158 within the housing 14. A second end of the camshaft 94 is supported by the anvil 126, which is retained in the front housing portion 22 by an anvil bushing 186.

Figure 8:
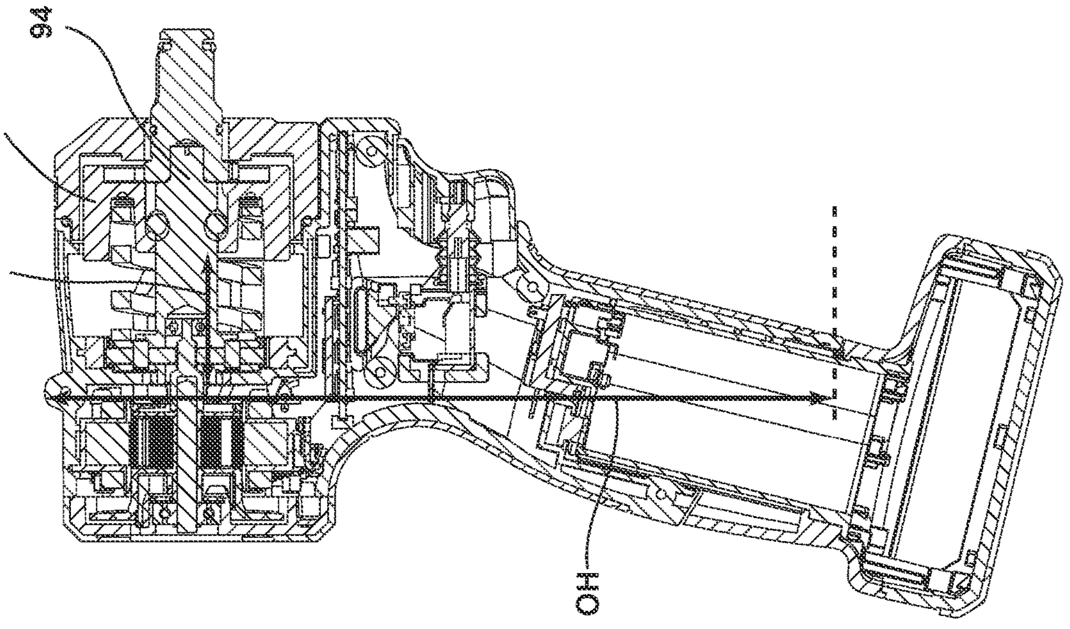
FIGS. 7 and 8 are dimensioned views of the power tool of FIG. 1, illustrating certain dimensions associated with the power tool in some embodiments.
Figure 7:
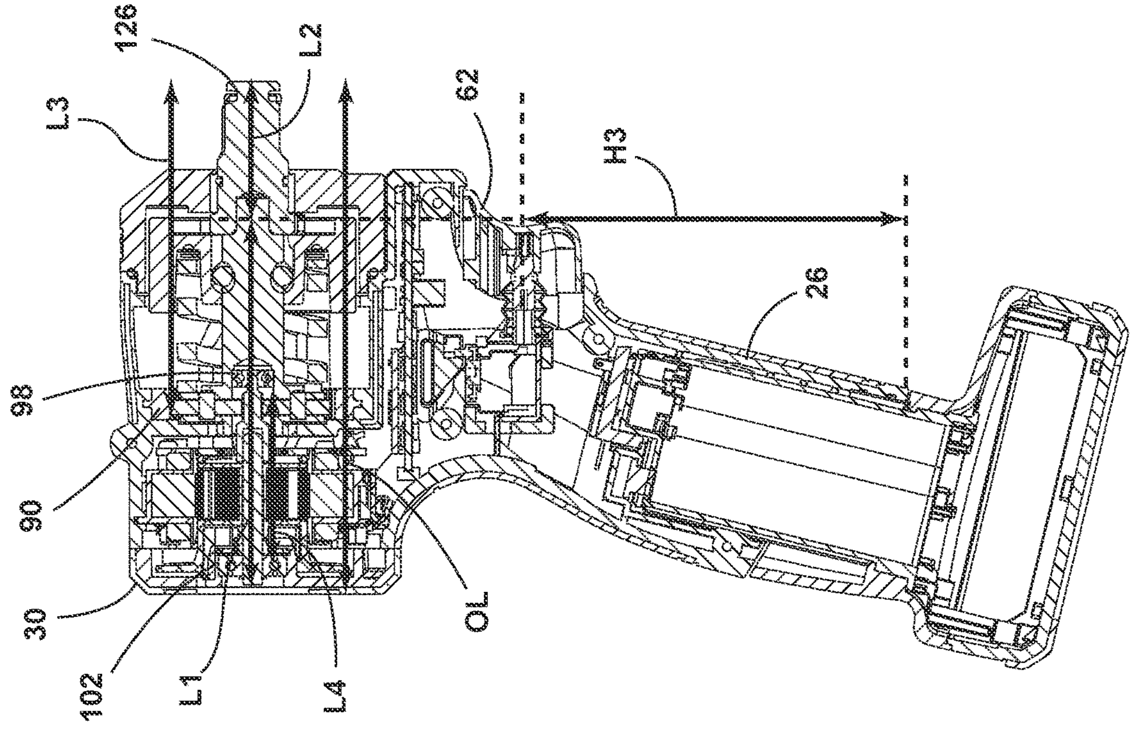

Referring now to FIGS. 7 and 8, dimensions of the impact wrench 10, according to one example construction, include a first length L1 defined axially between an end of the end cap 30 and an end of the trigger switch 62. In the illustrated embodiment, the first length L1 may be between approximately 79 mm and approximately 90 mm (e.g., 84 mm).

The impact wrench 10 may include a second length L2 defined axially between the end of the trigger switch 62 and a tip of the anvil 126. In the illustrated embodiment, the second length L2 may be between approximately 27 mm and approximately 35 mm (e.g., 29 mm).

The impact wrench 10 may further include a third length L3 defined axially between the tip of the anvil 126 and a first or rear end of the ring gear 90. In the illustrated embodiment, the third length L3 may be between approximately 75 mm and approximately 85 mm (e.g., 79 mm).

The impact wrench 10 may further include a fourth length L4 defined axially between a rear end of the rear bearing 102 and a rear end of forward bearing 98. In the illustrated embodiment, the fourth length L4 may be between approximately 39 mm and approximately 49 mm (e.g., 44 mm).

The impact wrench 10 may also include a height H3 defined linearly between a center of a plunger of the trigger switch 62 and a bottom of the handle portion 26. In the illustrated embodiment, the height may be between approximately 105 mm and approximately 140 mm (e.g., 125 mm).

As illustrated in FIG. 8, the impact wrench 10 may also include a fifth length L5 defined axially between a rear end of the camshaft 94 and a rear end of the hammer 130 when the spring 134 is in an uncompressed or free state/condition. In the illustrated embodiment, the fifth length L5 may be between approximately 25 mm and approximately 35 mm (e.g., 29 mm).

The combined dimensions (e.g., L1, L2, L3, L4, L5, H3, OH) of the illustrated impact wrench 10 are not known in the art such that the impact wrench 10 has advanced ergonomics without sacrificing operation capabilities (e.g., torque transmission, form factor, and the like).

In some embodiments, as illustrated in FIGS. 7 and 8, an overall length OL of the impact wrench 10 may be between approximately 106 mm and approximately 125 mm (e.g., 116 mm), and an overall height OH of the impact wrench 10 (not including the battery 34 may be between approximately 200 mm and approximately 235 mm (e.g., 225 mm). In the illustrated embodiment, the overall height OH is 1.6 times greater than the overall length OL.

The features and dimensions of the impact wrench 10, as described above, allow the impact wrench 10 to be both compact and lightweight. The impact wrench 10 has a total weight, not including the battery 34, between 2 and 2.15 pounds in some embodiments, or between 1.9 and 2.15 pounds in some embodiments. Furthermore, the impact wrench 10 is capable of delivering at least 350 ft-lbs. of fastening torque to a workpiece in some embodiments, or at least 500 ft-lbs. of fastening torque in other embodiments. In some embodiments, the impact wrench 10 may be capable of delivering between at least 230 ft-lbs. and 265 ft-lbs. of fastening torque per pound of weight.

In operation of the impact wrench 10, an operator depresses the switch 62 to activate the motor 42, which continuously drives the gear assembly 66 and the camshaft 94 via the output shaft 50. As the camshaft 94 rotates, the cam balls 154 drive the hammer 130 to co-rotate with the camshaft 94, and the drive surfaces of hammer lugs 146 to engage, respectively, the driven surfaces of anvil lugs to provide an impact and to rotatably drive the anvil 126 and the tool element. After each impact, the hammer 130 moves or slides rearward along the camshaft 94, away from the anvil 126, so that the hammer lugs 146 disengage the anvil lugs.

As the hammer 130 moves rearward, the cam balls 154 situated in the respective cam grooves 150 in the camshaft 94 move rearward in the cam grooves 150. The spring 134 stores some of the rearward energy of the hammer 130 to provide a return mechanism for the hammer 130. After the hammer lugs 146 disengage the respective anvil lugs, the hammer 130 continues to rotate and moves or slides forwardly, toward the anvil 126, as the spring 134 releases its stored energy, until the drive surfaces of the hammer lugs 146 re-engage the driven surfaces of the anvil lugs to cause another impact.

Figure 9:
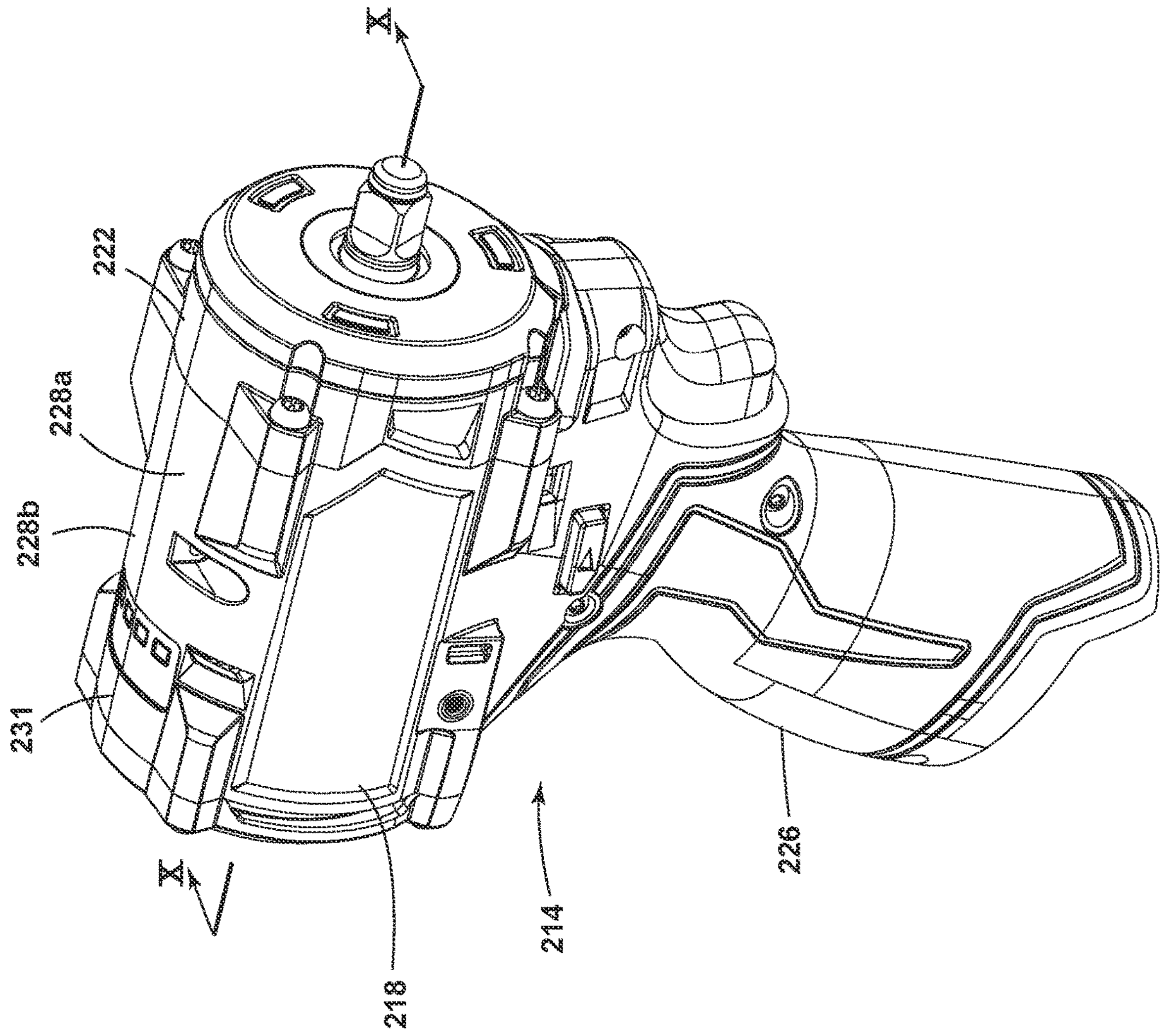
FIG. 9 is a perspective view of a power tool according to an embodiment of the invention.

FIG. 9 illustrates a power tool in the form of an impact wrench 210 according to another embodiment. The impact wrench 210 is similar in some aspects to the impact wrench 10 described above with reference to FIGS. 1-8, and features of the impact wrench 210 corresponding with features of the impact wrench 10 are given corresponding reference numerals plus '200.' The following description focuses primarily on differences between the impact wrench 210 and the impact wrench 10, and it should be understood that features of the impact wrench 210 and alternatives described herein may be incorporated into the impact wrench 10 where applicable, and vice versa.

Referring to FIG. 9, the illustrated impact wrench 210 includes a housing 214 with a motor housing portion 218, an impact case or front housing portion 222 coupled to the motor housing portion 218, and a handle portion 226 extending from the motor housing portion 218. The handle portion 226 and the motor housing portion 218 are defined by a first clamshell half 228*a* and a cooperating second clamshell half 228*b*, coupled together at an interface or seam 231.

Figure 10:
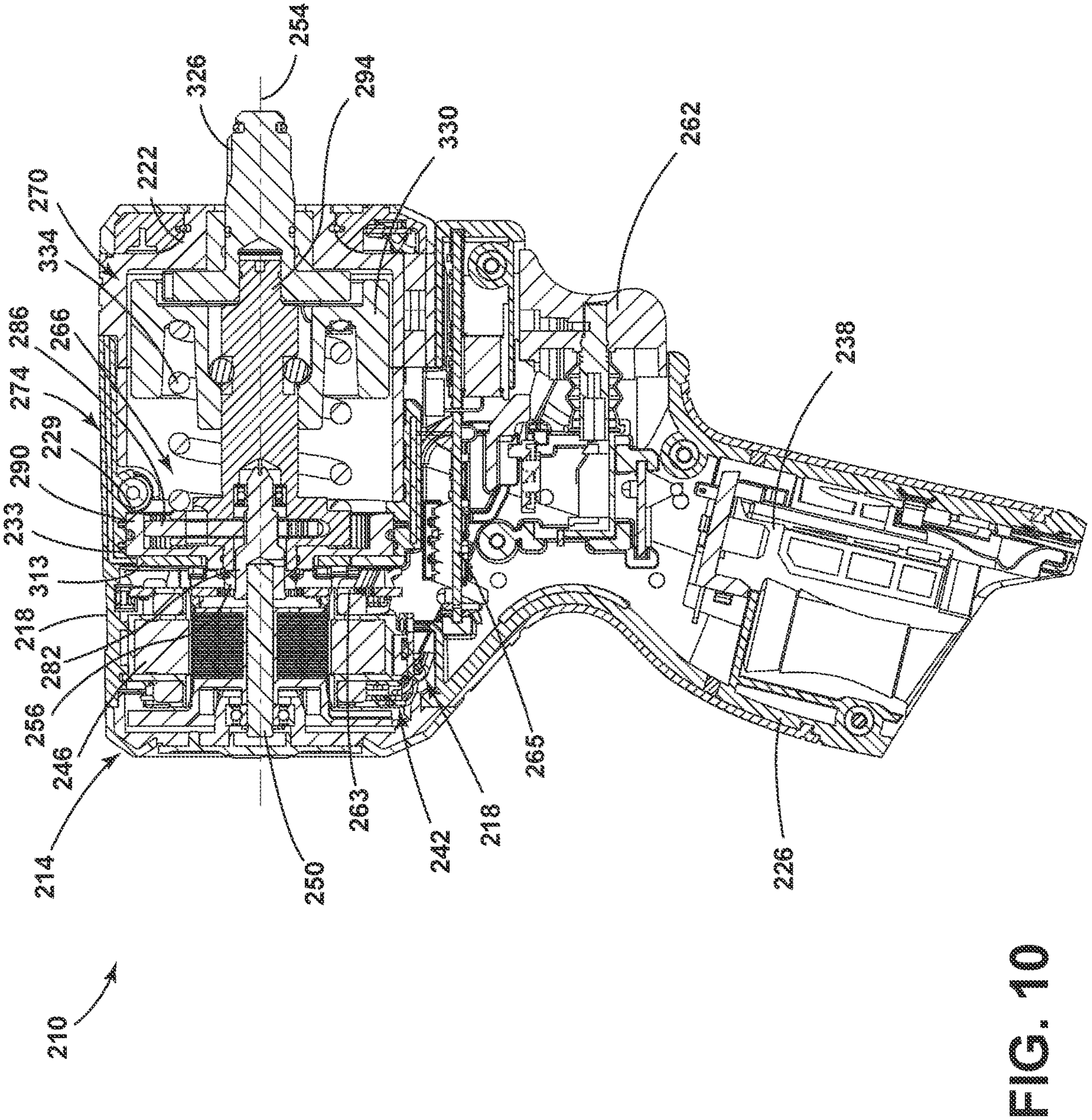
FIG. 10 is a cross-sectional view of the power tool of FIG. 9, taken along line 10-10 in FIG. 9.

With reference to FIG. 10, a motor 242 (e.g., a BLDC motor) is supported within the motor housing portion 218 and includes a stator 246 and a rotor with an output shaft 250 that is rotatable about an axis 254 relative to the stator 246. The impact wrench 210 also includes a switch 262 (e.g., a trigger switch; FIG. 10) supported by the housing 214 that selectively connects the motor 242 (e.g., via suitable control circuitry provided on one or more printed circuit board assemblies ("PCBAs") and a battery (not shown) electrically, to provide DC power to the motor 242.

A first PCBA 263 is provided adjacent a front end of the motor 242. The illustrated first PCBA 263 includes one or more Hall-Effect sensors, which provide feedback for controlling the motor 242. A second PCBA 265 is positioned within the handle portion 226 (adjacent a top end of the handle portion 226) and generally between the switch 262 and the motor 242. The second PCBA 65 is in electrical communication with the motor 242, the switch 262, and terminals of a battery receptacle 238 located in the handle portion 226. In the illustrated embodiment, the second PCBA 265 includes a plurality of semi-conductor switching elements (e.g., MOSFETs, IGBTs, or the like) that control and distribute power to windings in the stator 246 in order to cause rotation of the rotor and output shaft 250. The second PCBA 265 may also include one or more microprocessors, machine-readable, non-transitory memory elements, and other electrical or electronic elements for providing operational control to the impact wrench 210. In some embodiments, the first PCBA 263 may be omitted, and the motor 242 may be configured for sensorless control via the second PCBA 265.

The impact wrench 210 includes a gear assembly 266 driven by the output shaft 250 and an impact mechanism or drive assembly 270 coupled to an output of the gear assembly 266. The gear assembly 266 is at least partially housed within a gear housing portion 274 that is defined by the clamshell halves 228*a*, 228*b* and the front housing portion 222. Thus, like the impact wrench 10, the impact wrench 210 does not include a separate gear case positioned within the housing 214 for supporting the gear assembly 226. Instead, the gear assembly 266—and particularly a ring gear 290 of the gear assembly 266—is directly supported by the clamshell halves 228*a*, 228*b*. This may allow the ring gear 290 to have a larger diameter within a given size of the housing 14 than if the ring gear 290 were supported within a separate gear case within the housing 14. In the illustrated embodiment, the ring gear 290 may have an outer diameter that is greater than an inner diameter of the front housing portion 222.

Figure 13:
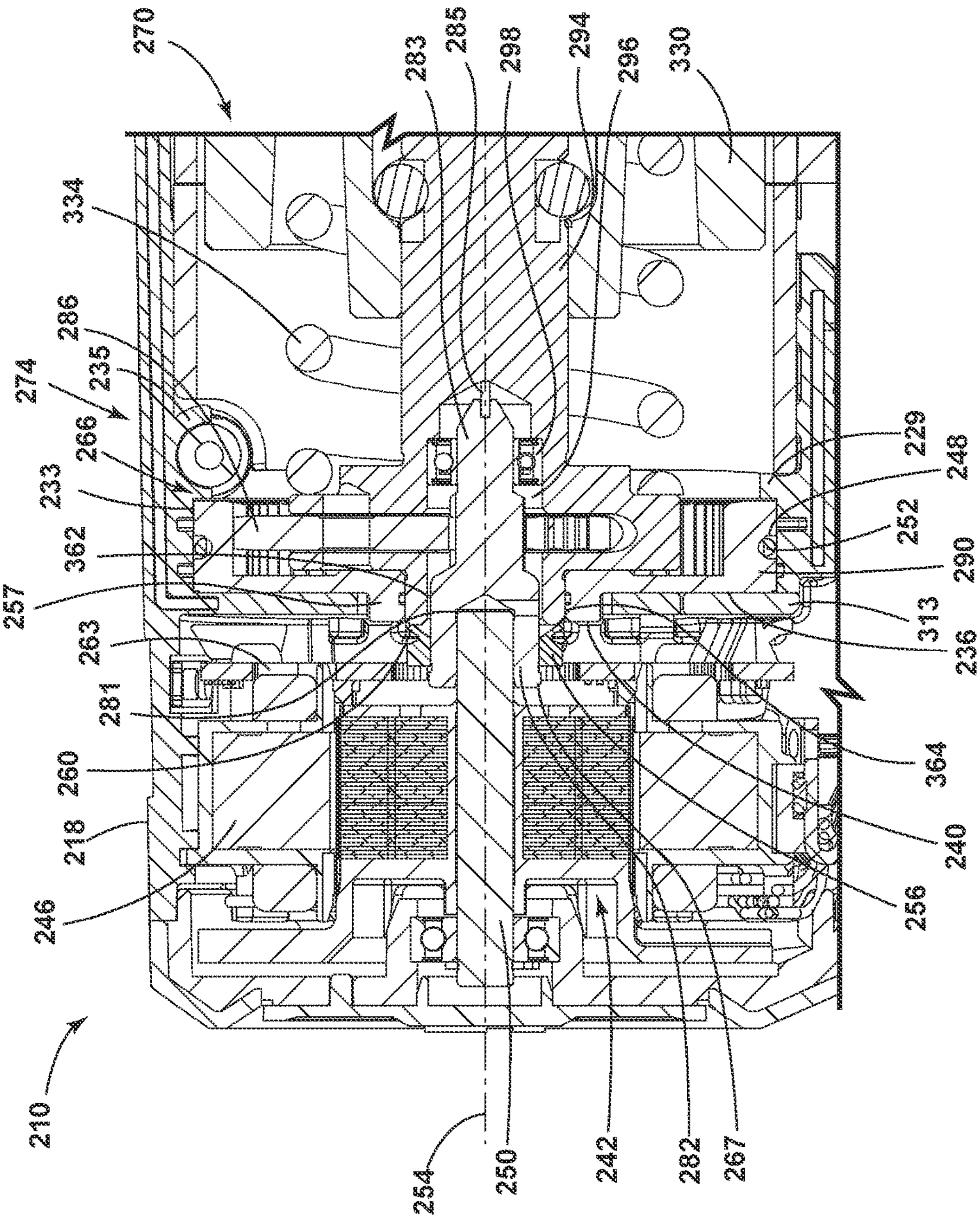
FIG. 13 is a magnified view of a portion of the cross-sectional view of FIG. 10.
Figure 14:
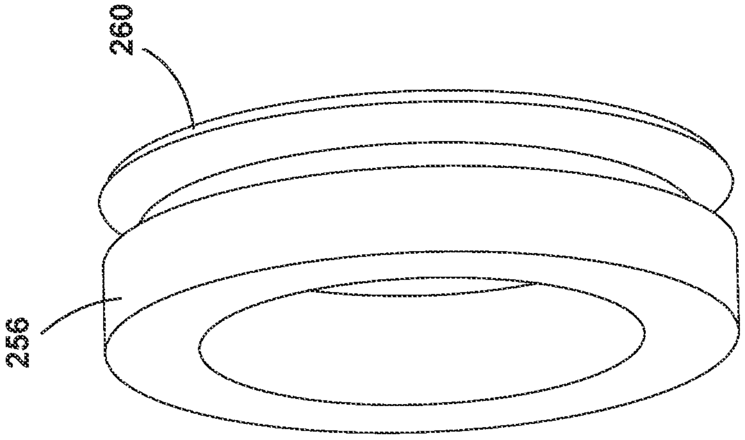
FIG. 14 is a perspective view of a sealing member of the power tool of FIG. 9.

Like the impact wrench 10, the drive assembly of the impact wrench 210 includes a camshaft 294, an anvil 326, a hammer 330, and a hammer spring 334. With reference to FIG. 13, the gear assembly 266 includes a pinion gear 282 coupled to the output shaft 250 of the motor 242, a plurality of planet gears 286 meshed with the pinion gear 282, and the ring gear 290, which is meshed with the planet gears 286 and rotationally fixed within the housing 214 (specifically, within the gear housing portion 274). The ring gear 290 is positioned within a groove 233 bounded in the axial direction by a first wall 313, which may be referred to as a dividing wall, and a second wall 229. The first wall 313 and the second wall 229 are each collectively defined by the two clamshell halves 228*a*, 228*b*. The first wall 313 separates the interior of the gear housing portion 274 from the motor 242. The second wall 229 is generally annular and centered with respect to the rotational axis 254. In the illustrated embodiment, the second wall 229 includes a portion of a boss 235, which projects into the gear housing portion 274 and receives a screw (not shown) to couple the clamshell halves 228*a*, 228*b* together.

Figure 11:
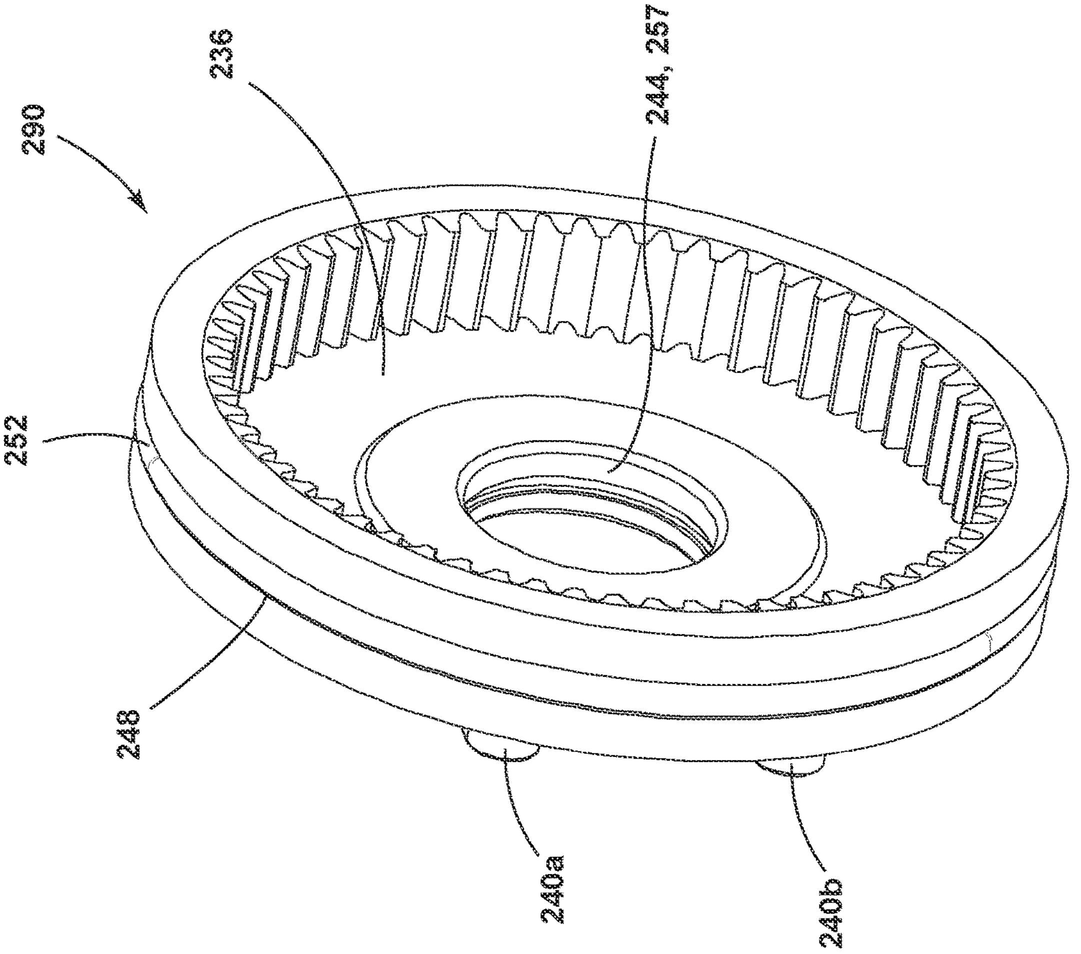
FIG. 11 is a perspective view of a ring gear of a gear assembly of the power tool of FIG. 9.
Figure 12:
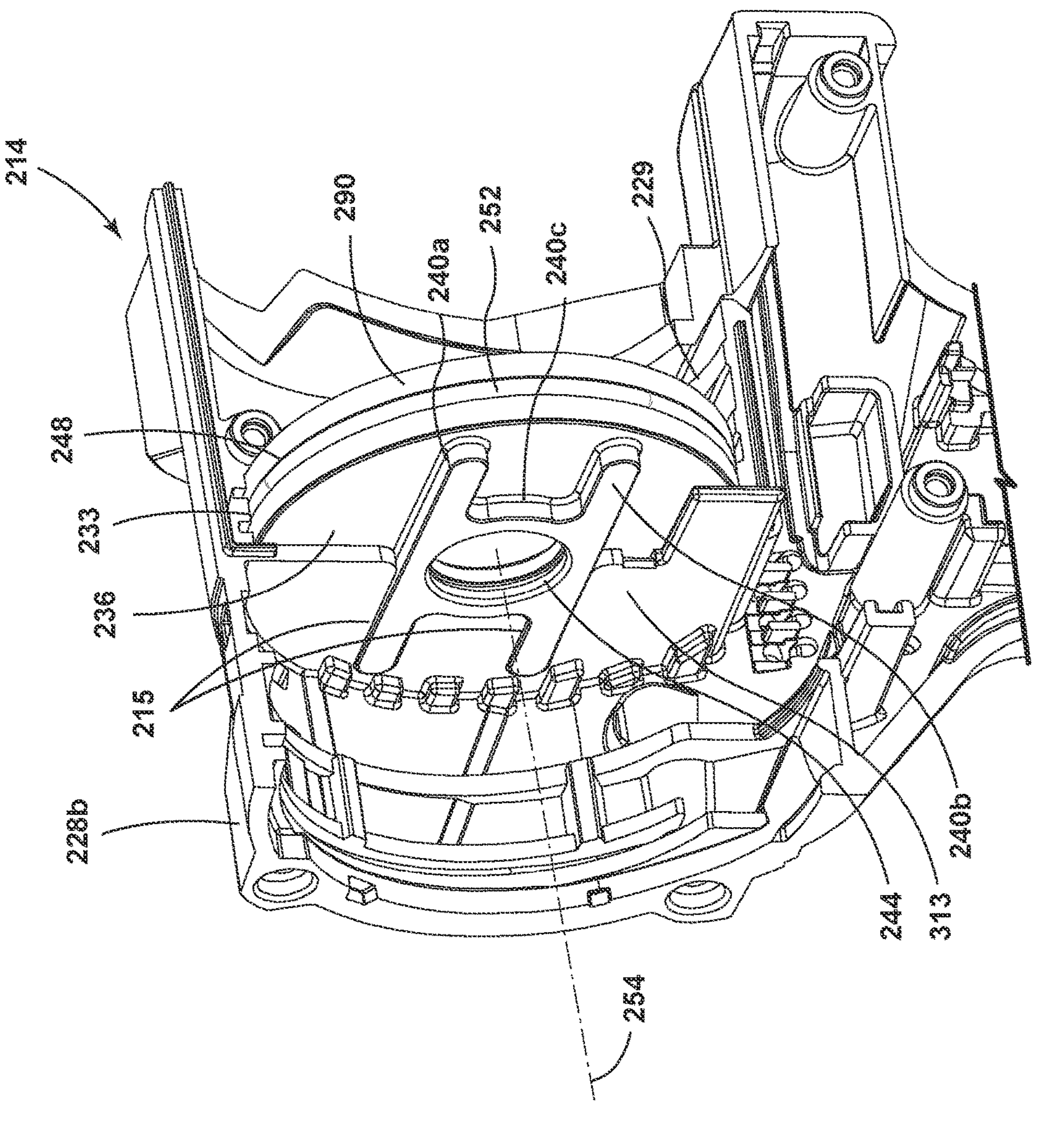
FIG. 12 is a perspective view of a portion of the power tool of FIG. 9, with portions of the power tool hidden.

As shown in FIGS. 11 and 12, the ring gear 290 includes a rear wall 236 with lugs 240*a*, 240*b* projecting from the rear wall 236. The lugs 240*a*, 240*b* are received within correspondingly shaped receptacles 215 in the first wall 313 to prevent rotation of the ring gear 290 relative to the housing 214. In the illustrated embodiment, the lugs 240*a*, 240*b* are generally linear and extend in a lateral (i.e., horizontal) direction perpendicular to the axis 254 and offset above and below the axis 254. The lugs 240*a*, 240*b* are interconnected by arcuate webs 240*c* surrounding an aperture 244 extending through the rear wall 236 of the ring gear 290. In some embodiments, the ring gear 290, including the lugs 240*a*, 240*b* and webs 240*c* may be integrally formed as a single piece from powdered metal. In other embodiments, the ring gear 290 may be formed in other ways.

Because the lugs 240*a*, 240*b* and the receptacles 215 are horizontally oriented, reaction forces on the first wall 313 of the housing 214 due to torque on the ring gear 290 during operation of the impact wrench 210 have resultant force vectors that are oriented in a generally vertical direction (i.e. generally parallel to the parting plane of the clamshell halves 228*a*, 228*b*.) For example, the lugs 240*a*, 240*b* may transmit reaction forces with resultant force vectors oriented at angles between 0 and 45 degrees relative to the parting plane in some embodiments or at angles between 0 and 30 degrees relative to the parting plane in some embodiments. The resultant force vectors therefore do not tend to cause separation of the clamshell halves 228*a*, 228*b*. This maintains the stability of the ring gear 290 and inhibits lubricant from leaking out of the gear housing portion 274.

Referring to FIGS. 12-13, the ring gear 290 includes an integrated bushing 257 defining the aperture 244 and rotationally supporting a rear end of the camshaft 294. The lugs 240*a*, 240*b*, webs 240*c*, and rear wall 236 together define a thickness of the bushing 257. In other embodiments, the rear end of the camshaft 294 may be supported in other ways, such as by a bearing supported within the aperture 244.

Best illustrated in FIG. 11, the ring gear 290 includes a radial groove 248 on the exterior of the ring gear 290, which receives a sealing member 252 (i.e., an O-ring). The O-ring 252 serves to inhibit lubrication from the gear housing portion 274 from leaking into the motor housing portion 218.

The illustrated pinion gear 282 includes a recess 281 that receives the output shaft 250 and an extension 283. The output shaft 250 may be press fit into the recess 281, or the output shaft 250 and the recess 281 may include cooperating spline patterns or other suitable geometries for coupling the pinion gear 82 for co-rotation with the output shaft 50. In other embodiments, the pinion gear 282 may be integrally formed as a single piece with the output shaft 250.

As shown in FIG. 13, the impact wrench 210 further includes a pinion seal 256, which in the illustrated embodiment is configured as a V-ring with a resilient flange 260 engageable with rear surfaces of the camshaft 294 and/or ring gear 290. The pinion seal 256 may be made of a flexible, resilient material, such as an elastomeric material in some embodiments. The illustrated pinion seal 256 is coupled to the pinion gear 282 (e.g., via an interference fit) for co-rotation therewith. In some embodiments, the inner periphery of the pinion seal 256 and the outer periphery of the pinion gear 282 may include cooperating non-circular geometries to couple the pinion seal 256 for co-rotation with the pinion gear 282. In the illustrated embodiment, the pinion gear 282 includes a shoulder 267 formed adjacent an end of the pinion gear 282 opposite the extension 283. The shoulder 267 may act as a back stop to prevent axial displacement of the pinion seal 256.

The flange 260 is configured to cover and thereby seal a camshaft-pinion interface 362 defined between an outer surface of the pinion gear 282 and an inner surface of the camshaft 294. Because the pinion gear 282 rotates at a different speed than the camshaft 294, a small clearance exists along the camshaft-pinion interface 362. The flange 260 of the pinion seal 256 inhibits lubricant from migrating into the motor housing portion 218 through the camshaft-pinion interface 362. In some embodiments, the flange 260 may also be configured to cover and thereby seal a camshaft-ring gear interface 364 defined between an outer surface of the camshaft 294 and an inner surface of the bushing 257 of the ring gear 290. The flange 260 of the pinion seal 256 may therefore also inhibit lubricant from migrating into the motor housing portion 218 through the camshaft-ring gear interface 364.

The flange 260 extends at an oblique angle relative to the axis 254; however, the angle may vary depending on the rotational speed of the motor shaft 250 and pinion gear 282. In particular, the angle may increase toward 90 degrees when the rotational speed of the motor shaft 250 exceeds a threshold speed, due to centrifugal forces on the flange 260 deforming the resilient material. The threshold speed may correspond with a no-load or idle speed of the motor 242, during which the hammer 330 does not reciprocate and impart impacts to the anvil 326. In some embodiments, the threshold speed is 15,000 RPM. In some embodiments, the threshold speed is 17,000 RPM. In some embodiments, the threshold speed is between 15,000 RPM and 30,000 RPM.

When the flange 260 deforms to increase the angle above the threshold speed, the flange 260 moves away from and out of engagement from the rear end of the camshaft 294 and the rear end of the ring gear 290. This advantageously reduces friction and wear that could otherwise occur at such high rotational speeds. Furthermore, the inventors have found that lubricant migration along the camshaft-pinion interface 362 and the camshaft-ring gear interface 364 is minimal at speeds above the threshold speed, since, during idle, the hammer 330 does not reciprocate.

Once load is applied to the motor 242 (e.g., when the anvil 326 engages a fastener offering sufficient resistance), the motor 242 slows the motor shaft 250 to a speed below the threshold speed. The flange 260 resiliently recovers to re-engage with the rear end of the camshaft 294 and/or the rear end of the ring gear 290. When the hammer 330 proceeds to reciprocate during a fastening operation, which may act like a piston to displace the lubricant, cause localized pressure increases, as well increase the temperature of the lubricant, the pinion seal 256 inhibits the lubricant from entering the motor housing portion 218 via the interfaces 362, 364.

In other embodiments, the seal 260 may be constructed in other ways and from other materials. For example, in some embodiments, the seal 260 may be a radial seal disposed radially between the pinion gear 282 and the interior surface of the camshaft 294. In such embodiments, the seal 260 may be carried by either the camshaft 294 or the pinion gear 282. In some embodiments, the seal 260 may include polyurethane. In other embodiments, the seal 260 may include a felt washer. In other embodiments, the seal 260 may include a multi-layer composition, such as a layer of foam, a layer of metal, and another layer of foam or a layer of elastomer.

Although the disclosure has been described in detail with reference to certain preferred embodiments, variations and modifications exist within the scope and spirit of one or more independent aspects of the disclosure as described. Various features of the disclosure are set forth in the following claims.

What is claimed is:

1. A power tool comprising:

a housing having a first housing portion and a second housing portion coupled to the first housing portion;

a motor directly mounted within the housing between the first and second housing portions and including an output shaft, the output shaft defining an axis;

a gear assembly supported within the housing and operably coupled to the motor, the gear assembly including a ring gear directly supported by the first and second housing portions, a pinion gear coupled for co-rotation with the output shaft, and a plurality of planet gears meshed with the pinion gear and the ring gear; and a drive assembly operably coupled to the gear assembly, the drive assembly including a camshaft, an anvil, a hammer configured to reciprocate along the camshaft to impart rotational impacts to the anvil in response to rotation of the camshaft, and a spring biasing the hammer towards the anvil, wherein the ring gear includes a plurality of lugs engaged with the first housing portion and the second housing portion to rotationally constrain the ring gear.

2. The power tool of claim 1, wherein the spring has a rectangular cross-section.

3. The power tool of claim 1, wherein the camshaft includes a bore, wherein the pinion gear is meshed with the planet gears within the bore, wherein the pinion gear includes an extension extending into the bore beyond the planet gears, wherein a bearing is supported within the bore, and wherein the bearing supports the extension of the pinion gear.

4. The power tool of claim 3, wherein the housing, the spring, the camshaft, the bearing, and the extension overlap along the axis such that a plane perpendicular to the axis intersects the housing, the spring, the camshaft, the bearing, and the extension.

5. The power tool of claim 3, further comprising an alignment pin received within the extension, the alignment pin configured to centrally align the pinion gear within the bore of the camshaft.

6. The power tool of claim 1, wherein the ring gear includes a bushing configured to support the camshaft.

7. The power tool of claim 1, wherein the plurality of lugs projects from a rear wall of the ring gear.

8. The power tool of claim 7, further comprising a seal disposed about an outer periphery of the ring gear.

9. The power tool of claim 1, wherein the plurality of lugs projects from an outer periphery of the ring gear.

10. The power tool of claim 9, further comprising a rib engageable with the first housing portion and the second housing portion to axially secure the ring gear.

11. The power tool of claim 1, further comprising a pinion seal coupled to the pinion gear for rotation therewith, wherein the pinion seal is configured to seal an interface between the pinion gear and the camshaft.

12. The power tool of claim 11, wherein the pinion seal is configured to engage a rear end of the camshaft when the output shaft rotates at a speed less than a threshold speed, and wherein the pinion seal is configured to disengage from the rear end of the camshaft when the output shaft rotates at a speed greater than the threshold speed.

13. The power tool of claim 12, wherein the threshold speed is between 15,000 RPM and 30,000 RPM.

14. The power tool of claim 1, wherein the power tool has an overall length measured along the axis from a rear end of the housing to a front end of the anvil between 106 mm and 125 mm, wherein the power tool has an overall height measured perpendicular to the axis between 200 mm and 235 mm, and wherein the power tool is capable of delivering at least 500 foot-pounds of fastening torque to a workpiece through the anvil.

15. A power tool comprising:

a housing having a motor housing portion and a handle portion extending from the motor housing portion, wherein the motor housing portion and the handle portion are defined by cooperating first and second clamshell halves coupled together along a parting plane;

a motor supported within the motor housing portion and including an output shaft, the output shaft defining an axis;

a gear assembly supported within the housing and operably coupled to the motor, the gear assembly including a ring gear directly supported by the first and second clamshell halves, a pinion gear coupled for co-rotation with the output shaft, and a plurality of planet gears meshed with the pinion gear and the ring gear; and a drive assembly operably coupled to the gear assembly, the drive assembly including a camshaft, an anvil, a hammer configured to reciprocate along the camshaft to impart rotational impacts to the anvil in response to rotation of the camshaft, and a spring biasing the hammer towards the anvil, wherein the ring gear includes a plurality of lugs engaged with the first and second clamshell halves to rotationally constrain the ring gear, and wherein the plurality of lugs is arranged such that all resultant force vectors on the first and second clamshell halves due to torque on the ring gear are oriented at an angle between 0 degrees and 45 degrees relative to the parting plane.

16. The power tool of claim 15, wherein the power tool has an overall length measured along the axis from a rear end of the housing to a front end of the anvil between 106 mm and 125 mm, wherein the power tool has an overall height measured perpendicular to the axis between 200 mm and 235 mm, and wherein the power tool is capable of delivering at least 500 foot-pounds of fastening torque to a workpiece through the anvil.

17. The power tool of claim 15, wherein the plurality of lugs projects from a rear wall of the ring gear.

18. The power tool of claim 15, wherein the plurality of lugs projects from an outer periphery of the ring gear.

19. A power tool comprising:

a housing having a first housing portion and a second housing portion coupled to the first housing portion;

a motor directly mounted within the housing between the first and second housing portions and including an output shaft, the output shaft defining an axis;

a gear assembly supported within the housing and operably coupled to the motor, the gear assembly including a ring gear and a pinion gear coupled to the output shaft; and a drive assembly operably coupled to the gear assembly, the drive assembly including a camshaft, an anvil, and a hammer configured to reciprocate along the camshaft to impart rotational impacts to the anvil in response to rotation of the camshaft, wherein the camshaft includes a bore through which an extension of the pinion gear extends; and a pinion seal supported on the pinion gear, the pinion seal including a flange configured to seal at least one selected from a group consisting of a first interface between the pinion gear and the camshaft, and a second interface between the camshaft and the ring gear.

20. The power tool of claim 19, wherein the pinion seal is configured to engage a rear end of the camshaft when the output shaft rotates at a speed less than a threshold speed, and wherein the pinion seal is configured to disengage from the rear end of the camshaft when the output shaft rotates at a speed greater than the threshold speed, and wherein the threshold speed corresponds with a no-load speed of the motor.

* * * * *